United States Patent
Piepenbrink et al.

(10) Patent No.: US 6,890,275 B1
(45) Date of Patent: May 10, 2005

(54) CONTINUOUSLY VARIABLE TRANSMISSION

(75) Inventors: Andreas Piepenbrink, Meersburg (DE); Bernd Fessler, Kressbronn (DE); Wolfgang Runge, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/958,191

(22) PCT Filed: Apr. 15, 2000

(86) PCT No.: PCT/EP00/03445

§ 371 (c)(1),
(2), (4) Date: Oct. 4, 2001

(87) PCT Pub. No.: WO00/65253

PCT Pub. Date: Nov. 2, 2000

(51) Int. Cl.[7] ............................................. F16H 61/00
(52) U.S. Cl. .................................... 474/28; 474/18
(58) Field of Search ..................... 474/18, 28; 475/45, 475/48

(56) References Cited

U.S. PATENT DOCUMENTS

| | | | | |
|---|---|---|---|---|
| 3,016,754 A | * | 1/1962 | Corey | 474/11 |
| 4,767,384 A | | 8/1988 | Moan | 474/28 |
| 5,108,348 A | | 4/1992 | Bornmann | 474/18 |
| 5,279,525 A | * | 1/1994 | Rattunde | 474/69 |
| 5,298,000 A | * | 3/1994 | Rattunde et al. | 474/24 |

FOREIGN PATENT DOCUMENTS

| | | | | |
|---|---|---|---|---|
| DE | 41 31 931 A1 | | 4/1992 | F16H/9/18 |
| DE | 4222636 A1 | * | 1/1994 | F16H/59/06 |
| DE | 43 31 266 A1 | | 3/1995 | F16H/59/06 |
| EP | 0 286 924 A1 | | 10/1988 | F16H/11/02 |
| JP | 01015564 A | * | 1/1989 | F16H/11/00 |
| WO | 91/14116 | | 9/1991 | F16H/61/00 |
| WO | 00/12918 | | 3/2000 | F16H/61/00 |

* cited by examiner

*Primary Examiner*—David A. Bucci
*Assistant Examiner*—Timothy McAnulty
(74) *Attorney, Agent, or Firm*—Davis & Bujold, PLLC

(57) ABSTRACT

A continuously variable transmission for a motor vehicle, possessing a variator (2, 2') with a primary V-pulley set (3, 3') and a secondary V-pulley set (4, 4'). In this arrangement are a primary V-pulley disk (5, 5') and a secondary V-pulley disk (6, 6'), which are axially slidable by hydraulic force for the controlled adjustment of a pressure can be, respectively, loaded with an oil flow through an electro-hydraulically controlled pressure supply apparatus (1, 1'). The pressure supply apparatus (1,1') is so designed, that the oil flow is brought to the V-pulley disks (5, 5', 5, 6') through a pressure line (8, 8', 9, 9') with at least one pressure controller (10, 10', 11, 11') and one pressure chamber (12, 12', 13, 13') with a variable volume (V1, V2). The pressure chamber (12, 12') of the primary V-pulley disk (5, 5') can be connected to a primary chamber 20, 20') of the cylinder (14, 14'), and the pressure chamber (13, 13') can be connected with a secondary chamber (21, 21') of said cylinder (14, 14'), in which, between the primary chamber (20, 20') and the secondary chamber (21, 21') a double action, reversible piston (15, 15') is placed for directing pressurized oil from a low pressure side to a high pressure side of the variator (2, 2') upon the shifting of said variator (2, 2').

11 Claims, 2 Drawing Sheets

CONTINUOUSLY VARIABLE TRANSMISSION

FIELD OF THE INVENTION

The invention concerns a continuously variable transmission for a motor vehicle, said transmission possessing a variator which comprises a primary V-pulley set and a secondary V-pulley set having a torque converting member, whereby a primary V-pulley disk and a secondary V-pulley disk, both of which are axially slidable, can be respectively loaded with a regulated adjustment of pressure and oil flow by means of an electrohydraulic controlled pressure supply apparatus.

BACKGROUND OF THE INVENTION

Continuously variable transmissions are stepless, adjustable, automatic transmissions. The stepless adjustment, i.e. shifting, is carried out by the axial displacement of two slidable, V-pulley disks of the variator acting on respective primary and secondary shafts. In this way, a change in the relationship between the highest possible ratio (i.e. low gear) and the smallest possible ratio (direct drive or overdrive) can be brought about.

In order to achieve the necessary frictional force on the torque converter, which in general is a steel thrust belt to transfer the motor torque, a continuing, specified, compression on the V-pulley disks is necessary. The shift of the V-pulley disks occurs by means of the application of an additional displacing pressure-increment on one of the two slidable V-pulley disks.

In the case of modes of construction of the CVT, known in practice, a pressure cylinder is placed on each adjustable V-pulley disk as a source of pressure apparatus, which undertakes both the necessary continuous application of pulley-pressure as well as shifting the V-pulley disk for the ratio change.

In this way, a completely independent control pressure is applied to each of the two V-pulley disks, and a necessary flow for shifting the variator is made available to the slidable V-pulley disks, likewise independent of one another.

Thus, for example, in a shift from the position LOW to the position OD with a higher gear, a first V-pulley disk is loaded with an oil volume and its holding-chamber is filled. Simultaneously, a second flow out of a second V-pulley disk of the other set of V-pulley disks is diverted into an oil receiver.

Analogous to this, by shifting the variator from an OD condition in the direction of the LOW ratio, the second V-pulley disk is filled causing the flow from the first V-pulley disk to be returned to the oil tank.

Since, in the case of stepless transmissions, except in a rare occurring constant driving situation, a ceaseless change of gear ratio is in progress, this means that continually, oil in the low pressure side must be deprived of pressure and is lost into the oil tank while, at the same time, oil with the necessary high pressure on the high pressure side must be transported.

This has the disadvantage that the flow relationships resulting from this, are geometrically strongly non-linear and necessary pump work must be carried out for the assurance of a high shifting dynamic by correspondingly large dimensioned pumps. The overall efficiency is thereby negatively affected, and the driving capacity of the motor is diminished by the power consumption of the pumps.

DE 41 31 931 discloses a stepless transmission, in which case one contact pressure cylinder each supplies the said necessary continuous pulley-pressure on the two displaceable V-pulley disks of the variator. For the sliding of the pulleys, another displacement cylinder is provided separately therefrom. In this arrangement, the cylinder chambers of the two contact-pressure cylinders are connected by a pressure compensation piping.

Since the degree of the contact-pressure for the assurance of the transmission of torque at the variator is dominant in relation to the pressure difference for shifting, which is necessary for the change of ratio, i.e. gears, the contact-pressure is generated by large effective piston areas in both of the inner cylinder chambers and so the pressure difference for shifting with small effective piston areas can be realized. In the shifting cylinders, the volumes exchange themselves upon a variator shift and the oil is lost into an oil tank. In the contact-pressure cylinders, the volumes do not vary, and the oil is only exchanged between the opposed chambers, whereby said oil remains in the system and does not have to be retransported.

This known solution, by means of the mechanics of the double V-pulley disks with outside cylinders and interconnected inner cylinders, enables a reduction of the hydraulic losses in the case of a variator displacement. However, the construction of this solution is complicated and expensive.

Thus, the purpose of the present invention is to create a continuously variable transmission with a variator of simple construction in which the hydraulic capacity losses are minimized by the control of said variator.

In accordance with the invention, this purpose is achieved by the features named in Claim 1.

SUMMARY OF THE INVENTION

By means of the invented construction of the continuously variable transmission, i.e. the pressure supply apparatus, with a piston equipped cylinder being placed between the pressure chambers of the primary V-pulley disk and the secondary V-pulley disks, a reversible double action bypass cylinder, parallel to the variator, is installed. By means of this, the low pressure side flow, the pressure of which is to be reduced by discharging oil, is fed back into the respective high pressure side.

With the invented pressure supply apparatus, an oil recycle is advantageously possible, in the case of which the pressurized oil which, upon shifting, would normally flow back into the tank, is guided into the pressure space of that V-pulley disk which is being subjected to the greater pressure. To accomplish this, active hydraulic elements, such as for example pumps, are not required.

Since, for the generation of the necessary flow for the shifting pressure, between the high pressure side and the low pressure side of the variator, to and fro pushing is required, this flow need not be transported out of an oil sump. This fact leads to a noticeable improvement of the overall efficiency.

Besides the advantage of saving energy, the invented solution also characterizes itself through a very simple and economical construction, which can be seen as an approach to a type of design which can be employed in the case of known hydraulic control systems of V-pulley sets of a variator, since a variator with customary single action cylinders must not be changed.

Further, the simple construction design contributes the fact that no additional sensors or electronic circuitry is necessary for the components thereof.

For the realization of the invented solution and of the desired approach to a minimizing of the loss of hydraulic capacity, i.e. oil loss, which is connected therewith, as a rule it is also not necessary to change a presently used, conventional hydraulic system.

Advantageously the invention enables maximum shifting gradients, that is, changes of gear ratios, per minute to be carried out at a minimal usage of oil, whereby the use of oil of the variator is reduced to a negligible portion by the design of the hydraulic system.

At the same time, assurance is provided that the pressure and shifting range of the variator is in no way changed or limited by the invention.

The present invention, thus, fulfills important collateral conditions especially for its installation in mass production of continuously variable transmissions.

BRIEF DESCRIPTION OF THE DRAWINGS

The invention will now be described, by way of example, with reference to the accompanying drawings in which.

DETAILED DESCRIPTION OF THE INVENTION

Figure 1:
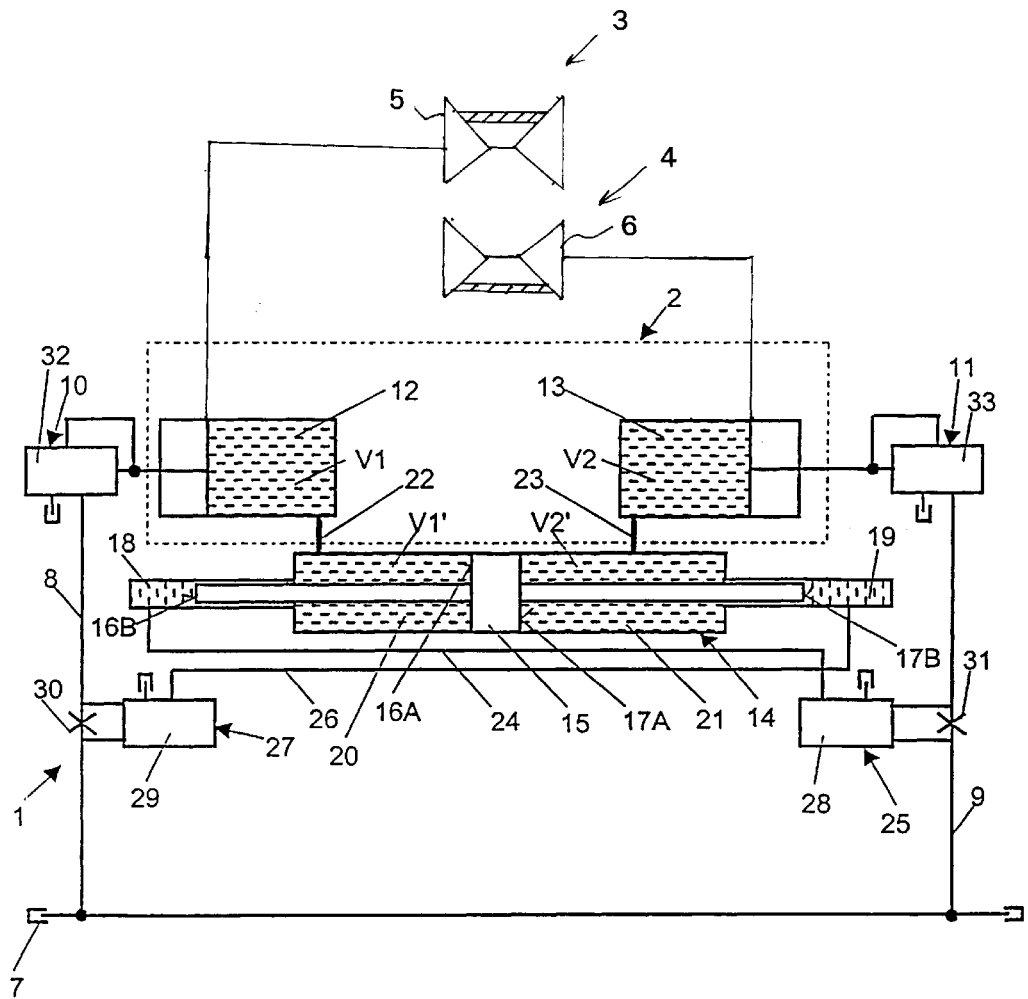
FIG. 1 is a schematic presentation of the principles of a variator of a continuously variable transmission with an invented pressure supply apparatus.
Figure 2:
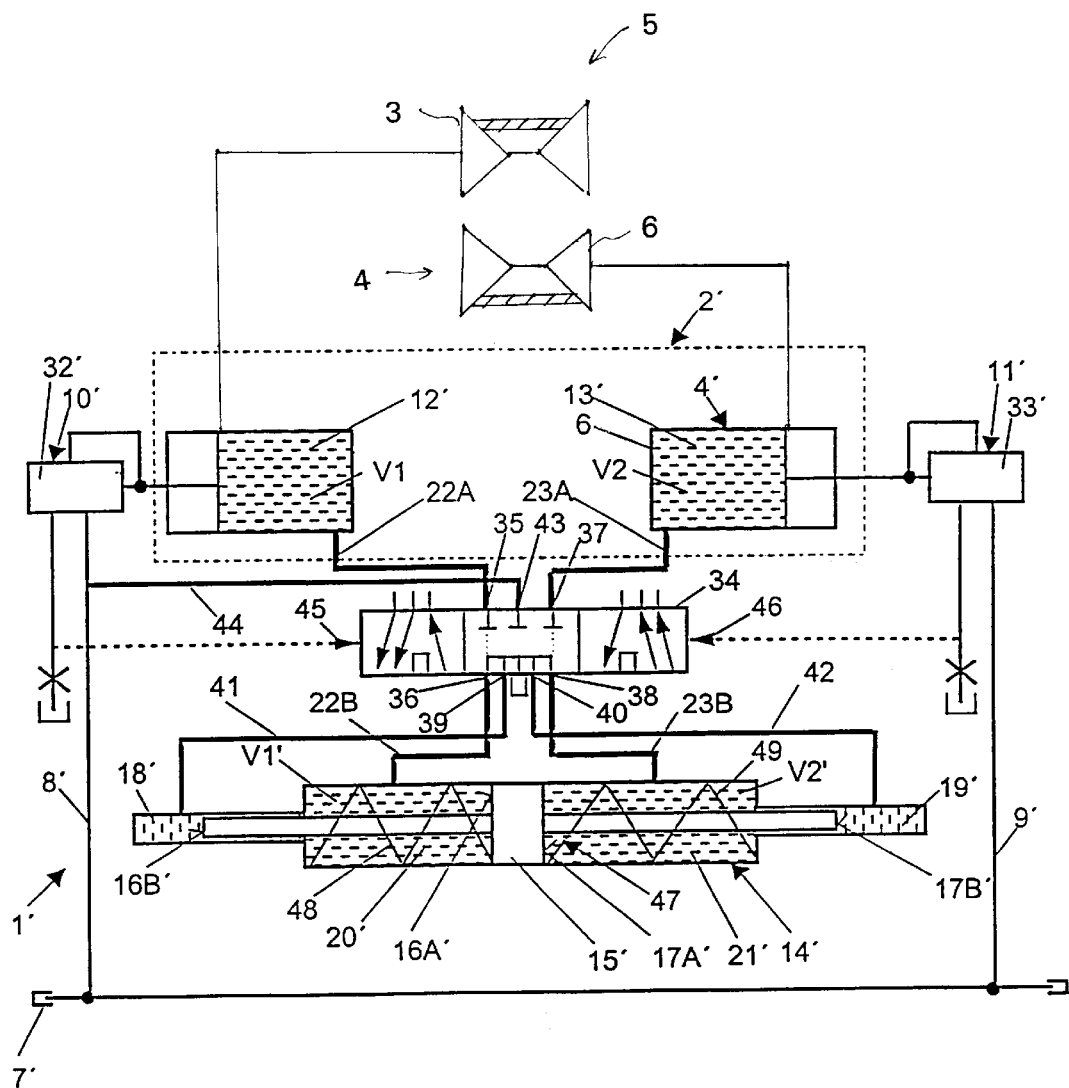
FIG. 2 is a schematic presentation of the principles of a variator in accordance with FIG. 1, with an alternative pressure supply apparatus.

Giving consideration to the electro/hydraulically controlled pressure supply apparatus 1 of a variator 2 of a continuously variable transmission for a motor vehicle, this is depicted in two versions in FIGS. 1 and 2, respectively, in highly schematized drawings.

The variator 2 possesses a schematically indicated primary V-pulley set 3 and a secondary V-pulley set 4, whereby a primary V-pulley disk 5 of the primary V-pulley set 3 and a secondary V-pulley disk 6 of the secondary V-pulley set 4 are slidingly hydraulically displaceable, in an axial direction, for displacement of the variator 2.

The V-pulley disks 5,6 are respectively loaded with an oil flow from a source of pressure 7, which comprises an oil tank or an oil sump, for a controlled pressure adjustment and control of the variator 2.

For this purpose, the oil flows are directed to the slidable V-pulley disks 5, 6 respectively by means of pressure lines 8 and 9. These said pressure lines 8, 9, respectively include pressure control apparatuses 10, 11. The pressure chambers connected thereto are, first, pressure chamber 12 of the primary V-pulley disk 5 with a variable volume V1, or second, pressure chamber 13 of the secondary V-pulley disk 6 with a variable volume V2, both lines 8, 9 being connected in parallel to the pressure and oil source 7, i.e. oil tank.

Parallel to the variator 2, a hydraulic, 2-way cylinder 14 with a piston 15 placed therein which is provided for the transfer of oil by means of its displacement from a low pressure side to a high pressure side. The piston's effective faces, 16A, its hydraulic operation, is located between two pressure chambers 18 and 19. Further, the piston 15 separates the primary chamber 20, with volume V1' which is fluidly linked to pressure chamber 12 of the primary V-pulley disk 5, from the secondary chamber 21, with volume V2' which is fluidly linked to pressure chamber 13 of the secondary V-pulley disk 6.

FIG. 1 demonstrates an embodiment in which the pressure chamber 12 of the primary V-pulley disk 5 is connected with the primary chamber 20 of the cylinder 14 by means of a line 22. Similarly, FIG. 1 also shows pressure chamber 13 of the secondary V-pulley disk 6 being connected with the secondary chamber 21 of the cylinder 14 via line 23. These connections are permanently open so that the same pressure level is in force between the volumes V1 and V1' or V2 and V2'.

The primary chamber 20 and the secondary chamber 21 of the cylinder 14 are separated from the working operating chambers 18, 19. The primary side operating chamber 18 is connected by a line 24 and a pressure control 25 with the pressure line 9 which is leading to the pressure chamber 13 of the secondary V-pulley disk 6. Similarly, the secondary side of operational chamber 19 is connected through a line 26 and a pressure control 27 with the pressure line 8 which is directed to pressure chamber 12 of the primary V-pulley disk 5.

The pressure control devices 25, 27 respectively include a flow control valve 28, 29 and an orifice 30, 31, whereby the orifices 30, 31 are placed in the pressure lines (respectively) 9, 8 which lead to the pressure chamber 13, 12.

Upon the exceeding a specified oil volume, the control devices 25, 27 switch over so that oil is conducted through the respective flow valves 28, 29 to the primary side operational chamber 18 or the secondary side operational chamber 19 of the cylinder 14.

If the manner of functioning is examined more closely, then the control of the variator is carried out by means of the pressure regulators 10,11 which are in the pressure lines 8,9 leading to the pressure chambers 12,13, which are respectively equipped with a pressure control valve 32, 33. The control is provided in such a manner that the contact pressure, applied to the V-pulley disks 5, 6, is individually adjustable by the said pressure control valve 32, 33.

By means of the flow control valves 28 and 29, which are respectively installed in the pressure lines 9, 8 leading to the pressure control valves 33, 32 upon exceeding a preset quantity of oil, the respective other side of the cylinder 14 is subjected to full pressure so that, in the case of a displacement of the variator 2, the oil expressed from one of the pressure chambers 12, 13 of the V-pulley disks 5, 6 flows into the respective cylinder primary chamber 20 or secondary chamber 21 which is fluidly connected with the respective chamber 12,13. In this case, an equivalent volume of oil, which lies on the other side of the piston 15 of the primary chamber 20 or of the secondary chamber 21 is forced into the pressure chamber 12 or 13 of the V-pulley disk connected to the respective chamber.

By way of example, in the case of a shift of the variator 2 from LOW toward OD, oil is forced into the pressure chamber 12 of the primary V-pulley disk 5 and oil is expelled from the pressure chamber 13 of the secondary V-pulley disk 6. The primary side flow valve 29 diverts the main pressure onto the secondary side of the cylinder 14, the piston 15 of which thereupon is pushed against the primary side operational chamber 18 and against the fluidly linked cylinder chamber 20. When this happens, the oil acting on the secondary V-pulley disk 6 moves into the secondary chamber 21 of the cylinder 14. At the same time, on the primary side, the oil volume which has been fed into the secondary side of the cylinder 14, is expelled into the pressure chamber 12 of the primary V-pulley disk 5. Further, as an example, because of some unsymmetrical, geometrical displacement relationships, oil necessary for the contact pressure against the primary V-pulley disk 5 is transported by means of the primary side pressure control valve 32 and its pressure line 8.

With the described hydraulic movement of the cylinder 14, this movement is forced, because of the desired gear change, to transfer the oil from the pressure chamber 12 or 13 of the primary V-pulley disk 5 or 6, whichever is to be reduced, to the other V-pulley disk. Since, the oil conducted from the low pressure side to the high pressure side corresponds to that necessary to be added for the shifting pressure, in contrast to the continuous contact pressure, the system brings about the maximum possible oil return.

The embodiment in accordance with FIG. 2 shows, in a similar manner, a pressure supply apparatus 1' for a variator 2' with a primary V-pulley set 3' having primary V-pulley disk 5' and the associated pressure chamber 12' as well as a secondary V-pulley set 4' having secondary V-pulley disk 6' and an associated pressure chamber 13'. These named V-pulley sets 3', 4' are supplied with oil from a pressure source 7' by means of pressure lines 8', 9' and the pressure regulation means 10', 11' with respectively pressure control valves 32' and 33'. The pressure supply apparatus 1' operates on the same principles as shown in FIG. 1.

Thus to accomplish the transport of oil from a low pressure side to a high pressure side of the variator 2', as shown in FIG. 1, the following components are present: a hydraulically 2-way cylinder 14' provided with a piston 15' which, on its operative surfaces 16A', 16B' and 17A', 17B' the piston in regard to effective area, is designed in 2-stages, wherein the said piston is retained between two operational chambers 18' and 19'. The piston 15' separates the primary chamber 20', which fluidly communicates with the pressure chamber 12' of the primary V-pulley disk 5' from the secondary chamber 21', which fluidly communicates with the pressure chamber 13' of the secondary V-pulley disk 6'.

In a differing aspect to the embodiment shown in FIG. 1, in which the cylinder 14 and the piston 15 is continually active, the piston 15' in the illustrated cylinder 14' of FIG. 2, is only movable when needed, that is in the case of a shift through the variator 2'.

For this purpose, a multiport valve 34 is provided, which has connection fittings 35, 36 for line 22A which leads to the pressure chamber 12' of the V-pulley disk 5' and a line 22B to the primary chamber 20' of the cylinder 14. The said multiport valve 34 also has connection fittings 37, 38 which, in respective order, connect to lines 23A and 23B. Line 23A leads to the pressure chamber 13' of the secondary V-pulley disk 6 and line 23B is connected to the secondary chamber 21' of the cylinder 14. In this way, the pressure chamber 12' of the primary V-pulley disk 5' can be connected to the primary chamber 20' and the pressure chamber 13' of the secondary V-pulley disk 6' can be connected to the secondary chamber 21 by means of the multiport valve 34.

Further, connection fittings 39, 40, for the lines 41, 42 designated for connection to operational chambers 18' and 19' of the piston 15' are on the multiport valve 34. Line 41, 42 can be connected to a line 44 which runs from a connection fitting 43 of the multiport valve 34 to the principal pressure line 8'.

The multiport valve 34, by means of control connection fittings 45, 46, can be hydraulically shifted into three positions, wherein a first position serves as an idle position, a second position is provided for oil pressure availability on the primary side and on the secondary side, and a third position for directing oil pressure from the secondary side to the primary side.

As shown in the embodiment in accordance with FIG. 1, the cylinder 14' operates with its hydraulic connections as a hydrostatic drive, which provides pressure for the shifting of the V-pulley disks 5', 6'. That is to say, provides oil flow from the side with the immediate lower pressure to the opposite, presently the high pressure side, wherein the system in accordance with FIG. 2 can be reset into an idle position.

In this idle position,.the piston 15' is held in a specified middle position, by means of a spring arrangement 47, which includes two springs 48 and 49, of which one spring 48 is placed precompressed in the primary chamber 20' and the other spring 49 is likewise placed precompressed in the secondary chamber 21'

| Reference numbers | |
|---|---|
| 1, 1' | pressure supply apparatus |
| 2, 2' | variator |
| 3, 3' | primary V-pulley set |
| 4, 4' | secondary V-pulley set |
| 5, 5' | primary V-pulley disk |
| 6, 6' | secondary V-pulley disk |
| 7, 7' | pressure source and oil tank |
| 8, 8' | pressure line |
| 9, 9' | pressure line |
| 10, 10' | pressure controller |
| 11, 11' | pressure controller |
| 12, 12' | pressure chamber |
| 13, 13' | pressure chamber |
| 14, 14' | cylinder |
| 15, 15' | piston, 2-area stages |
| 16A, 16A' | active face of piston |
| 16B, 16B' | active face of piston |
| 17A, 17A' | active face of piston |
| 17B, 17B' | active face of piston |
| 18, 18; | operational chamber of cylinder |
| 19, 19' | operational chamber of cylinder |
| 20, 20' | primary chamber |
| 21, 21' | secondary chamber |
| 22 | connecting pipe line |
| 22A | connecting pipe line |
| 22B | connecting pipe line |
| 23 | connecting pipe line |
| 23A | connecting pipe line |
| 23B | connecting pipe line |
| 24 | connecting pipe line |
| 25 | pressure control regulator |
| 26 | connecting pipe line |
| 27 | pressure control regulator |
| 28 | flow control valve |
| 29 | flow control valve |
| 30 | orifice |
| 31 | orifice |
| 32, 32' | pressure control valve |
| 33, 33' | pressure control valve |
| 34 | multiport valve |
| 35 | connection fitting on multiport valve |
| 36 | connection fitting on multiport valve |
| 37 | connection fitting on multiport valve |
| 38 | connection fitting on multiport valve |
| 39 | connection fitting on multiport valve |
| 40 | connection fitting on multiport valve |
| 41 | connecting pipe line |
| 42 | connecting pipe line |
| 43 | connection fitting on multiport valve |
| 44 | connecting pipe line |
| 45 | control connection to multiport valve |
| 46 | control connection to multiport valve |
| 47 | spring apparatus |
| 48 | spring |
| 49 | spring |
| V1 | volume pressure chamber of the primary V-pulley disk |
| V1' | volume primary chamber |
| V2 | volume pressure chamber of the secondary V-pulley disk |
| V2' | volume secondary chamber |

What is claimed is:

1. In a continuously variable transmission for a motor vehicle, including
    a variator having a primary V-pulley set and a secondary V-pulley set, the primary V-pulley set having a movable primary V-pulley disk and the secondary V-pulley set having a movable secondary V-pulley disk wherein the movable primary V-pulley disk and the movable secondary V-pulley disk are both displaceable by hydraulic force to facilitate pressure control adjustment of the continuously variable transmission; wherein
    the movable primary V-pulley disk includes a primary pressure chamber with a first variable volume and the movable secondary V-pulley disks includes a secondary pressure chamber with a second variable volume, and wherein
    the movable primary and secondary V-pulley disks are loaded by oil flow provided via an electro-hydraulically controlled pressure supply apparatus wherein the oil flow to the movable primary V-pulley disk is supplied from a reservoir solely through a primary pulley pressure line and at least one primary pressure controller and the oil flow to the movable secondary V-pulley disk is supplied from a reservoir solely through a secondary pulley pressure line (9, 9') and at least one secondary pressure controller;
    an oil recycling system for directly transferring pressurized oil volume between the pressure chamber of the V-pulley disk subject to a lesser actuation pressure and the pressure chamber of the V-Pulley disk subjected to a higher actuation pressure according to a difference between the lesser and higher actuation pressures to reduce a volume of oil transferred between the primary and secondary pressure chambers of the V-pulley disks and the oil reservoir during operation of the transmission, comprising:
        a hydraulic cylinder,
        a single moveable, reversible double action piston positioned between primary and secondary cylinder chambers of the cylinder to hydraulically separate the primary and secondary chambers and to control the volumes of the primary and secondary chambers in an inverse relationship by movement of the piston, and having
        a primary actuator and a secondary actuator respectively acted upon by a primary actuating pressure in a primary operating chamber in each of said primary and secondary cylinder chambers and a secondary actuating pressure in a secondary operating chamber in each of said primary and secondary cylinder chambers cylinder to control the position of the piston within the cylinder, wherein
        the primary cylinder chamber of the cylinder communicates with the primary pressure chamber of the primary V-pulley disk to form a single primary volume and to allow a flow of pressurized oil between the primary pressure chamber and the primary cylinder chamber of the cylinder, and
        the secondary chamber of the cylinder communicates with the secondary pressure chamber of the secondary V-pulley disk to form a single secondary volume to allow a flow of pressurized oil between the secondary pressure chamber and the secondary chamber of the primary cylinder chamber of the cylinder, and wherein
        the secondary operating chamber of the secondary cylinder chamber is connected from the secondary pulley pressure line and
        the secondary operating chamber is connected from the primary pulley pressure line, so that
            the position of the piston in the cylinder and the pressurized oil volumes of the primary and secondary volumes is thereby controlled by the pressures in the primary and secondary pulley pressure lines, and so that
            the pressurized oil volume is transferred between the primary pressure chamber of the V-pulley disk subject to a lesser actuation pressure and the primary pressure chamber of the V-Pulley disk subjected to a higher actuation pressure according to the difference between the lesser and higher actuation pressures.

2. The continuously variable transmission according to claim 1, wherein an oil pressure which is transferred from a low pressure side to a high pressure side of the variator (2, 2') corresponds to a necessary shifting pressure in addition to a contact pressure.

3. The continuously variable transmission according to claim 1, wherein the double action piston (15, 15') is located between the secondary operating cambers of both primary and secondary cylinder chambers (18, 18', 19, 19') which are subjectable to pressure, and each of a plurality of effective faces (16A, 16A', 16B, 16B', 17A, 17A', 17B, 17B') of the double action piston (15, 15') is a 2-stage piston which facilitates control of the oil flow between the primary pressure chamber (12, 12') and the secondary pressure chamber (13, 13') and vice versa.

4. The continuously variable transmission according to claim 3, wherein the primary pressure chamber (12) of the movable primary V-pulley disk (5) is in constant communication with the primary cylinder chamber (20) of the cylinder (14, 14') and the secondary pressure chamber (13) of the secondary V-pulley disk (6) is in constant communication with the secondary cylinder chamber (21) of the cylinder (14, 14').

5. The continuously variable transmission according to claim 3, wherein a pressure control regulator (25) connects the secondary pulley pressure line (9, 9'), coupled with the secondary pressure chamber (13, 13') of the movable secondary V-pulley disk (6, 6'), with the secondary operating chamber of the primary cylinder chamber.

6. The continuously variable transmission according to claim 3, wherein by a pressure control regulator (27) connects the primary pulley pressure line (8, 8'), coupled with the primary pressure chamber (12, 12') of the movable primary V-pulley disk (5, 5'), with the secondary operating chamber of the secondary cylinder chamber.

7. The continuously variable transmission according to claim 3, wherein a first pressure control regulator (25) connects the secondary pulley pressure line (9, 9'), coupled with the secondary pressure chamber (13, 13') of the movable secondary V-pulley disk (6, 6'), with the secondary operating chamber of the primary cylinder chamber; and
    a second pressure control regulator (27) connects the primary pulley pressure line (8, 8'), coupled with the primary pressure chamber (12, 12') of the movable primary V-pulley disk (5, 5'), with the secondary operating chamber of the secondary cylinder chamber.

8. The continuously variable transmission according to claim 7, wherein the pressure supply apparatus (1) includes:
    a first orifice (30) which is located within the primary pulley pressure line (8, 8'), leading to the primary pressure chamber (12, 12') of the movable primary V-pulley disk (5, 5'), and
    a second orifice (31) which is located within the secondary pulley pressure line (9, 9'), leading to the secondary pressure chamber (13, 13') of the movable secondary V-pulley disk; and upon the oil flow through the primary pulley pressure line (8, 8') exceeding a predetermined value, the first orifice (30) alters the oil to flow to the first pressure control regulator (25) associated with the first orifice (30); and upon the oil flow through the secondary pulley pressure line (9, 9') exceeding a predetermined value, the second orifice (31) alters the oil to flow to the second pressure control regulator (27) associated with the second orifice (31).

9. The continuously variable transmission according to claim 1, wherein the pressure supply apparatus (1) includes at least one flow control valve (28, 29).

10. A continuously variable transmission for a motor vehicle, comprising:

a variator having a primary V-pulley set and a secondary V-pulley set, the primary V-pulley set having a movable primary V-pulley disk and the secondary V-pulley set having a movable secondary V-pulley disk wherein the movable primary V-pulley disk and the movable secondary V-pulley disk are both displaceable by hydraulic force to facilitate pressure control adjustment of the continuously variable transmission; wherein the movable primary V-pulley disk includes a primary pressure chamber with a first variable volume and the movable secondary V-pulley disks includes a secondary pressure chamber with a second variable volume, and wherein the movable primary and secondary V-pulley disks are loaded by oil flow provided via an electro-hydraulically controlled pressure supply apparatus wherein the oil flow to the movable primary V-pulley disk is supplied from a reservoir solely through a primary pulley pressure line and at least one primary pressure controller and the oil flow to the movable secondary V-pulley disk is supplied from a reservoir solely through a secondary pulley pressure line (9, 9') and at least one secondary pressure controller;

an oil recycling system for directly transferring pressurized oil volume between the pressure chamber of the V-pulley disk subject to a lesser actuation pressure and the pressure chamber of the V-Pulley disk subjected to a higher actuation pressure according to a difference between the lesser and higher actuation pressures to reduce a volume of oil transferred between the primary and secondary pressure chambers of the V-pulley disks and the oil reservoir during operation of the transmission, comprising:

a hydraulic cylinder, a single moveable, reversible double action piston positioned between primary and secondary cylinder chambers of the cylinder to hydraulically separate the primary and secondary chambers and to control the volumes of the primary and secondary chambers in an inverse relationship by movement of the piston, wherein the primary chamber of the cylinder communicates with the primary pressure chamber of the primary V-pulley disk to form a single primary volume, and the secondary chamber of the cylinder communicates with the secondary pressure chamber of the secondary V-pulley disk to form a single secondary volume, and a primary pressure control regulator connects the primary pulley pressure line with the primary pressure chamber of the primary V-pulley disk and with a secondary operational chamber of the secondary chamber cylinder; and a secondary pressure control regulator connects the secondary pulley pressure line with the secondary pressure chamber of the secondary V-pulley disk and with a secondary operational chamber of the primary cylinder chamber.

11. A continuously variable transmission for a motor vehicle, comprising:

a variator having a primary V-pulley set and a secondary V-pulley set, the primary V-pulley set having a movable primary V-pulley disk and the secondary V-pulley set having a movable secondary V-pulley disk wherein the movable primary V-pulley disk and the movable secondary V-pulley disk are both displaceable by hydraulic force to facilitate pressure control adjustment of the continuously variable transmission; wherein the movable primary V-pulley disk includes a primary pressure chamber with a first variable volume and the movable secondary V-pulley disks includes a secondary pressure chamber with a second variable volume, and wherein the movable primary and secondary V-pulley disks are loaded by oil flow provided via an electro-hydraulically controlled pressure supply apparatus wherein the oil flow to the movable primary V-pulley disk is supplied from a reservoir solely through a primary pulley pressure line and at least one primary pressure controller and the oil flow to the movable secondary V-pulley disk is supplied from a reservoir solely through a secondary pulley pressure line (9, 9') and at least one secondary pressure controller;

an oil recycling system for directly transferring pressurized oil volume between the pressure chamber of the V-pulley disk subject to a lesser actuation pressure and the pressure chamber of the V-Pulley disk subjected to a higher actuation pressure according to a difference between the lesser and higher actuation pressures to reduce a volume of oil transferred between the primary and secondary pressure chambers of the V-pulley disks and the oil reservoir during operation of the transmission, comprising:

a hydraulic cylinder, a single moveable, reversible double action piston positioned between primary and secondary cylinder chambers of the cylinder to hydraulically separate the primary and secondary chambers and to control the volumes of the primary and secondary chambers in an inverse relationship by movement of the piston, and having a primary actuator and a secondary actuator respectively acted upon by a primary actuating pressure in a primary operating chamber in each of said primary and secondary cylinder chambers and a secondary actuating pressure in a secondary operating chamber in each of said primary and secondary cylinder chambers to control the position of the piston within the cylinder, wherein the primary chamber cylinder of the cylinder communicates with the primary pressure chamber of the primary V-pulley disk to form a single primary volume, and a secondary cylinder chamber of the cylinder communicates with the secondary pressure chamber of the secondary V-pulley disk to form a single secondary volume, and a primary pressure control regulator connects the primary pulley pressure line with the primary pressure chamber of the primary V-pulley disk and with the secondary operational chamber of the secondary cylinder chamber; and a secondary pressure control regulator connects the secondary pulley pressure line with a secondary pressure chamber of the secondary V-pulley disk and with the secondary operational chamber of the primary cylinder chamber, whereby movement of the double action single piston induces transfers of the oil between the primary pressure chamber and the secondary pressure chamber.

* * * * *